US010254486B2

(12) United States Patent
Kondo et al.

(10) Patent No.: US 10,254,486 B2
(45) Date of Patent: Apr. 9, 2019

(54) OPTICAL RECEPTACLE (71) Applicant: TOTO LTD., Kitakyushu-Shi, Fukuoka (JP)

(72) Inventors: Sho Kondo, Fukuoka-Ken (JP); Satoshi Hakozaki, Fukuoka-Ken (JP); Hirotsugu Agatsuma, Fukuoka-Ken (JP)

(73) Assignee: Toto Ltd., Fukuoka (JP)

( * ) Notice: Subject to any disclaimer, the term of this patent is extended or adjusted under 35 U.S.C. 154(b) by 0 days.

(21) Appl. No.: 15/792,151

(22) Filed: Oct. 24, 2017

(65) Prior Publication Data
US 2018/0059333 A1    Mar. 1, 2018

Related U.S. Application Data (63) Continuation of application No. 14/900,711, filed as application No. PCT/JP2014/067073 on Jun. 26, 2014, now Pat. No. 9,804,341.

(30) Foreign Application Priority Data

Jun. 28, 2013   (JP) .................................. 2013-136496
Mar. 7, 2014    (JP) .................................. 2014-045649

(51) Int. Cl.
G02B 6/36    (2006.01)
G02B 6/38    (2006.01)
G02B 6/42    (2006.01)
(52) U.S. Cl.
CPC ......... *G02B 6/3846* (2013.01); *G02B 6/3822* (2013.01); *G02B 6/3861* (2013.01);
(Continued)

(58) Field of Classification Search
None
See application file for complete search history.

(56) References Cited

U.S. PATENT DOCUMENTS 4,679,895 A    7/1987   Huber
4,877,300 A    10/1989  Newhouse et al.
(Continued)

FOREIGN PATENT DOCUMENTS

EP    0 471 838 B1    5/1997
JP    S61-124908 A    6/1986
(Continued)

OTHER PUBLICATIONS

Chinese Office Action dated Jan. 12, 2018 in the counterpart patent application No. 201480035645.7 with the English translation thereof.

*Primary Examiner* — Michelle R Connelly
(74) *Attorney, Agent, or Firm* — Carrier Blackman & Associates, P.C.; Joseph P. Carrier; William D. Blackman (57) ABSTRACT An optical receptacle, includes a fiber stub having an optical fiber with a core and cladding, a ferrule with a through-hole fixing the optical fiber, a bonding agent fixing the optical fiber in the through hole and a holder holding the fiber stub. The optical fiber is disposed inside the through-hole over an entire region of the optical fiber, and includes a portion in which a core diameter and a fiber outer diameter decrease gradually toward an end surface of the ferrule on a side opposite to a side to be optically connected to a plug ferrule. The bonding agent is filled into a space between the optical fiber and an inner wall of the through-hole.

8 Claims, 5 Drawing Sheets (52) U.S. Cl.
CPC ........... *G02B 6/3863* (2013.01); *G02B 6/421* (2013.01); *G02B 6/4292* (2013.01)

(56) References Cited

U.S. PATENT DOCUMENTS

| | | | | |
|---|---|---|---|---|
| 5,208,887 | A * | 5/1993 | Grinderslev | G02B 6/3859 348/E5.022 |
| 5,754,721 | A | 5/1998 | Pan | |
| 6,062,742 | A | 5/2000 | Yuuki | |
| 6,094,517 | A | 7/2000 | Yuuki | |
| 7,280,724 | B2 | 10/2007 | Yoshikawa | |
| 7,413,353 | B2 | 8/2008 | Beer et al. | |
| 7,419,308 | B2 | 9/2008 | Ma | |
| 8,083,419 | B2 | 12/2011 | Sato | |
| 8,641,607 | B2 | 2/2014 | Shimotsu | |
| 9,575,262 | B2 * | 2/2017 | Kondo | G02B 6/3861 |
| 9,581,775 | B2 * | 2/2017 | Kondo | G02B 6/3822 |
| 9,804,341 | B2 * | 10/2017 | Kondo | G02B 6/421 |
| 9,810,852 | B2 * | 11/2017 | Kondo | G02B 6/3846 |
| 2005/0220424 | A1 | 10/2005 | Asano et al. | |
| 2010/0104243 | A1 | 4/2010 | Kewitsch | |
| 2010/0172617 | A1 | 7/2010 | Sato | |
| 2010/0210911 | A1 * | 8/2010 | Shimotsu | A61B 1/00096 600/178 |
| 2012/0053420 | A1 | 3/2012 | Kasamatsu et al. | |
| 2017/0293072 | A1 * | 10/2017 | Kondo | G02B 6/02033 |

FOREIGN PATENT DOCUMENTS

| | | | |
|---|---|---|---|
| JP | H09-127360 | A | 5/1997 |
| JP | 2006-119633 | A | 5/2006 |
| JP | 2006119633 | A * | 5/2006 |
| JP | 2010-181867 | A | 8/2010 |
| JP | 4883969 | B2 | 2/2012 |

* cited by examiner

|  | | FIBER CORE DIAMETER DIFFERENCE (D2-D1)[μm] | | | | | |
|---|---|---|---|---|---|---|---|
|  | | 5 | 4 | 3 | 2 | 1 | 0 |
| CORE DIAMETER CONVERSION PORTION LENGTH L [μm] | 2000 | -6.126 | -2.596 | -1.007 | -0.320 | -0.070 | -0.0393 |
| | 1000 | -5.638 | -2.503 | -0.996 | -0.325 | -0.066 | |
| | 500 | -5.100 | -2.366 | -0.975 | -0.320 | -0.066 | |
| | 250 | -4.389 | -2.118 | -0.857 | -0.306 | -0.066 | |
| | 100 | -3.635 | -1.831 | -0.830 | -0.301 | -0.070 | |
| | 50 | -3.645 | -1.952 | -0.926 | -0.343 | -0.074 | |

OPTICAL RECEPTACLE

CROSS-REFERENCE TO RELATED APPLICATIONS

This application is a continuation of U.S. patent application Ser. No. 14/900,711, filed Dec. 22, 2015, which is the US National Phase of PCT/JP2014/067073, filed 26 Jun. 2014, and which claims priority from two Japanese Patent Applications, i.e., No. 2013-136496, filed on Jun. 28, 2013, and No. 2014-045649, filed Mar. 7, 2014. The entire subject matter of each of these priority applications is incorporated herein by reference.

TECHNICAL FIELD

Embodiments of the invention relate generally to an optical transceiver module for optical communication and relate particularly to an optical receptacle favorable for a high-speed communication module.

BACKGROUND ART

An optical receptacle is used as a component for optically connecting an optical fiber connector to an optical element such as a light receiving element, a light emitting element, etc., in an optical module of an optical communication transceiver (e.g., referring to Patent Citation 1).

In recent years, it is necessary to increase the speed of optical communication transceivers as IP traffic increases. Generally, the configurations of the transceiver and the like that employ the receptacle-type optical module are standardized; and it is necessary to downsize the optical module because the space necessary for the electronic circuit increases as the modulation rate of the optical signal emitted from a semiconductor laser which is one optical element is increased.

The mode field diameter of the semiconductor laser element is smaller than a core diameter of 10 µm of the optical fiber generally used as the transmission line of the optical signal.

In recent years, optical modules also are being used to increase the communication speed of optical transceivers, where the optical module has a structure in which multiple semiconductor lasers are included inside a single module; the light that is emitted from each of the semiconductor lasers is multiplexed in one waveguide inside the optical waveguide formed in the interior of a plate-like member; and subsequently, optical coupling is made to the optical fiber of the optical receptacle. To downsize these optical modules, it is necessary to downsize the plate-like member having the optical waveguide described above; and there is a trend of the core diameter of the optical waveguide becoming smaller.

In an optical module in which a light receiving element is used instead of the light emitting element as well, there is a trend of reducing the light-receiving diameter of the light receiving element for use in higher-speed longer-distance communication applications.

In the case where there is a difference between the fiber core diameter and the mode field diameter of the optical element, while it is necessary for the lens to have a magnification function to condense the light emitted from the semiconductor laser elements into the fiber core or condense the light emitted from the fiber core into the light receiving element, a method is known to prevent the module total length from simultaneously becoming undesirably long by reducing the fiber core diameter of a portion of the optical element side end surface of the optical fiber (e.g., referring to Patent Citation 2).

However, as in FIG. 1 or FIG. 2 of Patent Citation 2, normally, although it is necessary to locally add a refractive index control additive to the fiber to convert the core diameter while the outer diameter of the normal fiber remains constant, in this method, there is a problem of economic production being extremely difficult not only because the work method is complex but also because the control items are extremely numerous.

Also, unlike the description recited above, although it is possible to produce economically in the case where the outer diameter of the fiber tip changes and the core diameter of the tip portion changes as in FIG. 3, there is a problem of the fiber breaking and many cracks occurring because the portion that is exposed outside the ferrule has a lower strength due to the smaller outer diameter of the fiber due to the changing core diameter of the fiber end surface.

CITATION LIST

Patent Literature

[Patent Citation 1] JP 2010-181867 A (Kokai)
[Patent Citation 2] JP 4883969

SUMMARY OF INVENTION

Technical Problem

To solve the problems recited above, embodiments of the invention are directed to provide an optical receptacle in which, by making the core small at the optical element side end surface of the optical fiber while contributing to shortening the optical module total length, the strength of the deformable portion of the optical fiber can be ensured; the occurrence of breaking and cracks can be prevented; and the decrease of the coupling efficiency can be prevented by suppressing the movement of the optical fiber when using the optical module.

Solution to Problem

According to an aspect of the invention, there is provided an optical receptacle, comprising: a fiber stub including an optical fiber, a ferrule, and an elastic member, the optical fiber including cladding and a core conducting light, the ferrule having a through-hole fixing the optical fiber, the elastic member fixing the optical fiber in the ferrule; and a holder holding the fiber stub, the optical fiber being disposed inside the through-hole over an entire region of the optical fiber, the optical fiber including a portion, a core diameter and a fiber outer diameter in the portion decreasing gradually toward an end surface of the ferrule on a side opposite to a side to be optically connected to a plug ferrule, the elastic member being filled into a space between the optical fiber and an inner wall of the through-hole.

DESCRIPTION OF EMBODIMENTS

A first aspect of the invention is an optical receptacle, comprising: a fiber stub including an optical fiber, a ferrule, and an elastic member, the optical fiber including cladding and a core conducting light, the ferrule having a through-hole fixing the optical fiber, the elastic member fixing the optical fiber in the ferrule; and a holder holding the fiber stub, the optical fiber being disposed inside the through-hole over an entire region of the optical fiber, the optical fiber including a portion, a core diameter and a fiber outer diameter in the portion decreasing gradually toward an end surface of the ferrule on a side opposite to a side to be optically connected to a plug ferrule, the elastic member being filled into a space between the optical fiber and an inner wall of the through-hole.

According to the optical receptacle, the length of the optical module can be reduced because the core diameter at the end surface of the ferrule on the side opposite to the side to be optically connected to the plug ferrule is smaller than the core diameter at the end surface of the ferrule on the side to be optically connected to the plug ferrule. Also, the discrepancies of breaking and cracks of the optical fiber are suppressed because the entire optical fiber exists inside the through-hole of the ferrule.

Because the elastic member exists in a wedge-like configuration at the outer circumference of the portion where the outer diameter of the optical fiber is finer, the protrusion of the optical fiber outside the ferrule can be suppressed; and chipping and cracks of the outer circumference of the optical fiber can be suppressed.

Further, because the position of the end surface of the optical fiber is controlled easily, the connection loss when assembling the optical module can be reduced; and the optical module can be assembled economically.

A second aspect of the invention is the optical receptacle according to the first aspect of the invention, wherein an end surface of the optical fiber and the end surface of the ferrule exist in substantially the same plane at the end surface of the fiber stub on the side opposite to the side to be optically connected to the plug ferrule.

According to the optical receptacle, the connection loss when assembling the optical module can be reduced; and the optical module can be assembled easily.

A third aspect of the invention is the optical receptacle according to the first aspect of the invention, wherein a refractive index of the core at the portion is substantially the same as the refractive index of the core other than at the portion, and a refractive index of the cladding at the portion is substantially the same as the refractive index of the cladding other than at the portion.

According to the optical receptacle, by setting the refractive indexes of the cladding and the core to be constant over the entire optical fiber, the loss control inside the optical fiber can be easy; and the optical receptacle can be produced economically.

A fourth aspect of the invention is the optical receptacle according to the first aspect of the invention, wherein a center of the core exists within a range of 0.005 millimeters from a center of the ferrule at the end surface of the fiber stub on the side opposite to the side to be optically connected to the plug ferrule.

According to the optical receptacle, by controlling the position of the core of the optical fiber, the connection loss when assembling the optical module can be reduced; and the optical module can be assembled easily.

A fifth aspect of the invention is the optical receptacle according to the first aspect of the invention, wherein the end surface of the ferrule and an end surface of the optical fiber are polished to be substantially perpendicular to a central axis of the fiber stub at the end surface of the fiber stub on the side opposite to the side to be optically connected to the plug ferrule.

According to the optical receptacle, by polishing the end surface of the optical fiber to be perpendicular to the central axis of the fiber stub, the positional alignment between the optical receptacle and the optical element connected to the optical receptacle can be easy; and the optical module can be produced economically.

A sixth aspect of the invention is the optical receptacle according to the first aspect of the invention, wherein an end surface of the optical fiber and a portion of the end surface of the ferrule have a prescribed angle from a plane perpendicular to a central axis of the fiber stub at the end surface of the fiber stub on the side opposite to the side to be optically connected to the plug ferrule.

According to the optical receptacle, by polishing the end surface of the optical fiber and a portion of the end surface of the ferrule to have a prescribed angle from a plane perpendicular to the central axis of the fiber stub, the light that is emitted from the light emitting element connected to the optical receptacle, is incident on the optical fiber, and is reflected at the end surface of the optical fiber can be prevented from returning to the light emitting element; and the optical element can operate stably.

Embodiments of the invention will now be illustrated with reference to the drawings. Similar components in the drawings are marked with the same reference numerals, and a detailed description is omitted as appropriate.

Figure 1:
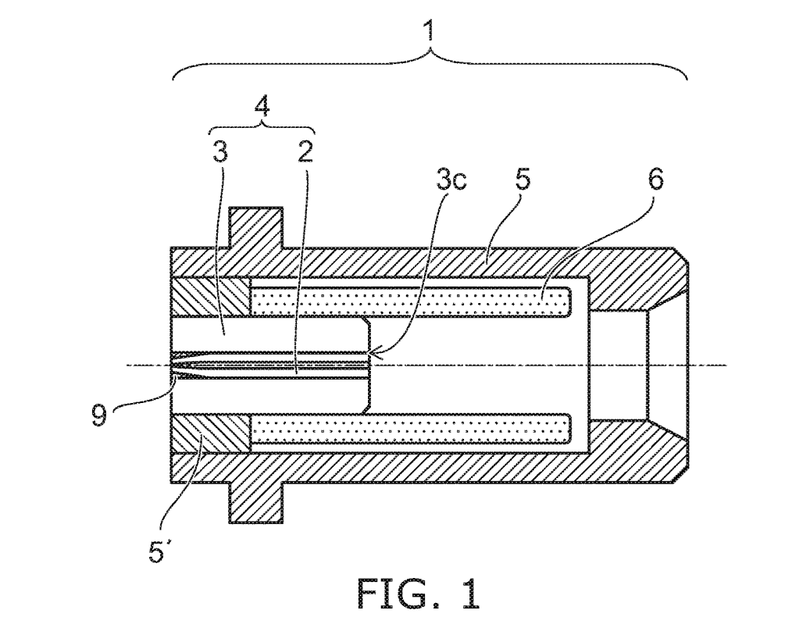
FIG. 1 is a schematic cross-sectional view of an optical receptacle showing a first embodiment of the invention.

FIG. 1 is a schematic cross-sectional view of an optical receptacle showing a first embodiment of the invention.

The optical receptacle 1 is made of a fiber stub 4, a holder 5 and inner holder portion 5' holding the fiber stub 4, and a sleeve 6, where the fiber stub 4 includes an optical fiber 2, a ferrule 3 having a through-hole 3c holding the optical fiber 2, and an elastic member 9, one end of the sleeve 6 is capable of holding a tip of the fiber stub 4, one other end of the sleeve 6 is capable of holding the plug ferrule inserted into the optical receptacle 1, and the optical fiber 2 is fixedly adhered using the elastic member 9 in the through-hole 3c of the ferrule 3. As shown, an outside face of the inner holder portion 5' contacts an inside face of the holder 5. The plug ferrule that is inserted into the optical receptacle 1 is not shown.

Although materials suited to the ferrule 3 include a ceramic, glass, etc., a zirconia ceramic is used in the example; the optical fiber 2 is fixedly adhered in the center of the ferrule 3; and one end (an end surface 3b: referring to FIG. 2) to be optically connected to the plug ferrule is formed by polishing into a convex spherical surface. Also, in many cases, the fiber stub 4 is pressed into the inner holder portion 5' and fixed by the holder 5 and the inner holder portion 5' in the assembly of the optical receptacle 1.

Although materials suited to the sleeve 6 include a resin, a metal, a ceramic, etc., a split sleeve made of a zirconia ceramic having a slit in the total length direction was used in the example. At the one end, the sleeve 6 can hold the tip portion (the end surface 3b) of the fiber stub 4 polished into the convex spherical surface; and at the one other end, the sleeve 6 can hold the plug ferrule inserted into the optical receptacle.

Figure 2:
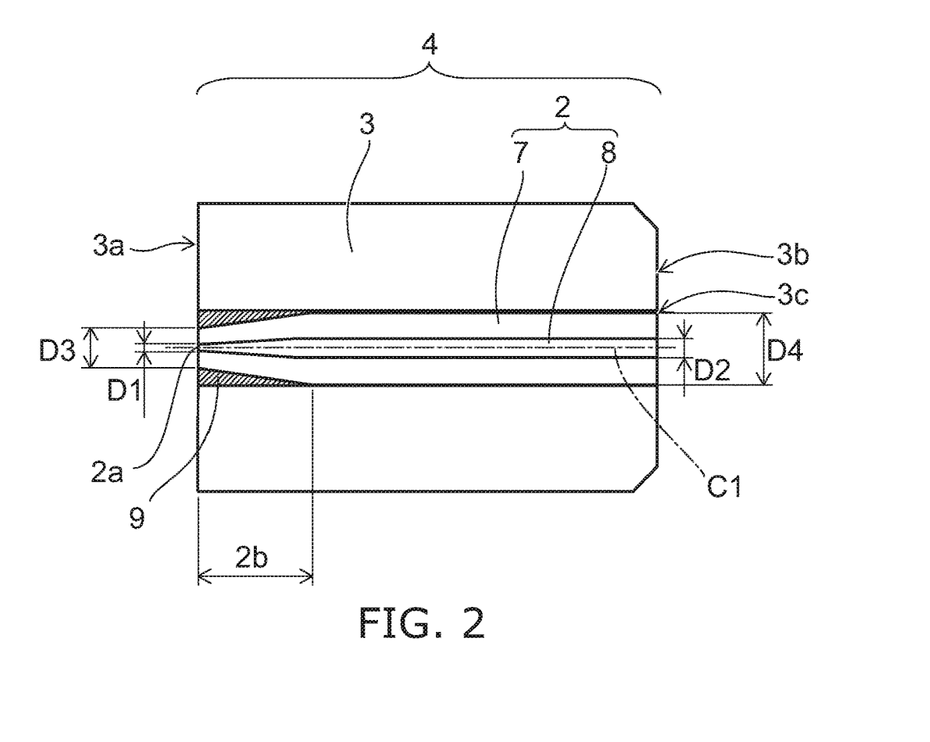
FIG. 2 is an enlarged cross-sectional view of the fiber stub of the first embodiment of the invention.

FIG. 2 is an enlarged cross-sectional view of the fiber stub of the first embodiment of the invention.

The optical fiber 2 is made of cladding 7 and a core 8 and includes a portion where the fiber outer diameter and the core diameter decrease gradually toward the tip portion (an end surface 2a) so that a core diameter D1 at an end surface 3a of the fiber stub 4 on the side opposite to the end surface 3b polished into the convex spherical surface is smaller than a core diameter D2 of the end surface 3b polished into the convex spherical surface; and the entire portion 2b where the outer diameter is deformed is contained inside the through-hole 3c of the ferrule 3. That is, a fiber outer diameter D3 at the end surface 3a is smaller than a fiber outer diameter D4 at the end surface 3b.

Methods for reducing the fiber outer diameter and the core diameter of the optical fiber 2 include a method for pulling the optical fiber tip portion while applying heat not less than the melting point of quartz to the outer circumference of a prescribed section of the fiber, etc.

The optical fiber 2 is fixed in the through-hole 3c of the ferrule 3 of the fiber stub 4 by using the elastic member (the bonding agent) 9. Here, while resin bonding agents such as epoxy, silicone, etc., are examples of materials suited to the bonding agent, a high temperature-curing epoxy bonding agent was used in the example. The same bonding agent is filled without a gap in the space existing between the through-hole 3c of the ferrule 3 and the interior wall of the optical fiber 2.

Here, normally, the strength is lower for the portion 2b where the outer diameter of the optical fiber 2 decreases gradually compared to the portion where the outer diameter is maintained at a constant. In the first embodiment of the invention, the entire portion 2b where the outer diameter of the optical fiber 2 decreases gradually is contained inside the through-hole 3c of the ferrule 3; further, because the periphery is covered with the elastic member 9 as the bonding agent, the phenomena of the optical fiber 2 breaking and cracks occurring do not occur easily when the end surface 2a of the optical fiber 2 is polished and when actually using as an optical module.

Also, normally, in the optical receptacle 1, the end surface 2a of the optical fiber 2 at the end surface 3a of the fiber stub 4 on the side opposite to the end surface 3b polished into the convex spherical surface is polished to be a flat surface substantially perpendicular to a central axis C1 of the ferrule 3 (the same as the central axis of the fiber stub) to prevent the reflections of the light at the end surface 2a of the optical fiber 2 when the light is incident on the optical fiber 2 or the light is emitted from the optical fiber 2. Here, it is desirable for substantially perpendicular to refer to about 85 degrees to 95 degrees with respect to the central axis C1 of the ferrule 3.

In the first embodiment of the invention, the end surface 2a of the optical fiber 2 is polished to be a flat surface perpendicular to the central axis C1 of the ferrule 3; further, the end surface 2a of the optical fiber 2 and the end surface 3a of the ferrule 3 exist in substantially the same plane. Here, it is desirable for substantially the same plane to be such that the distance between the end surface 2a of the optical fiber 2 and the end surface 3a of the ferrule 3 is about −250 nm to +250 nm.

Thereby, a large external force is no longer applied directly to the outer circumference of the optical fiber 2; and the phenomena of the optical fiber 2 breaking and cracks occurring when polishing the end surface 2a of the optical fiber 2, etc., can be prevented.

The refractive index of the cladding 7 at the portion 2b where the outer diameter of the optical fiber 2 decreases gradually is substantially the same as the refractive index of the cladding 7 other than at the portion 2b where the outer diameter of the fiber 2 decreases gradually. The refractive index of the core 8 at the portion 2b where the outer diameter of the optical fiber 2 decreases gradually is substantially the same as the refractive index of the core 8 other than at the portion 2b where the outer diameter of the fiber 2 decreases gradually. Here, substantially the same refractive index is not less than about 1.4 and not more than about 1.6.

Thereby, by setting the refractive indexes of the cladding 7 and the core 8 to be constant for the entire optical fiber 2, the loss control inside the optical fiber 2 can be easy; and the optical receptacle 1 can be produced economically.

At the end surface 3a of the fiber stub 4 on the side opposite to the end surface 3b polished into the convex spherical surface, the center of the core 8 of the optical fiber 2 exists within a range of 0.005 millimeters (mm) from the center of the ferrule 3. Thereby, by controlling the position of the core 8 of the optical fiber 2, the connection loss when assembling the optical module can be reduced; and the optical module can be assembled easily.

Figure 3:
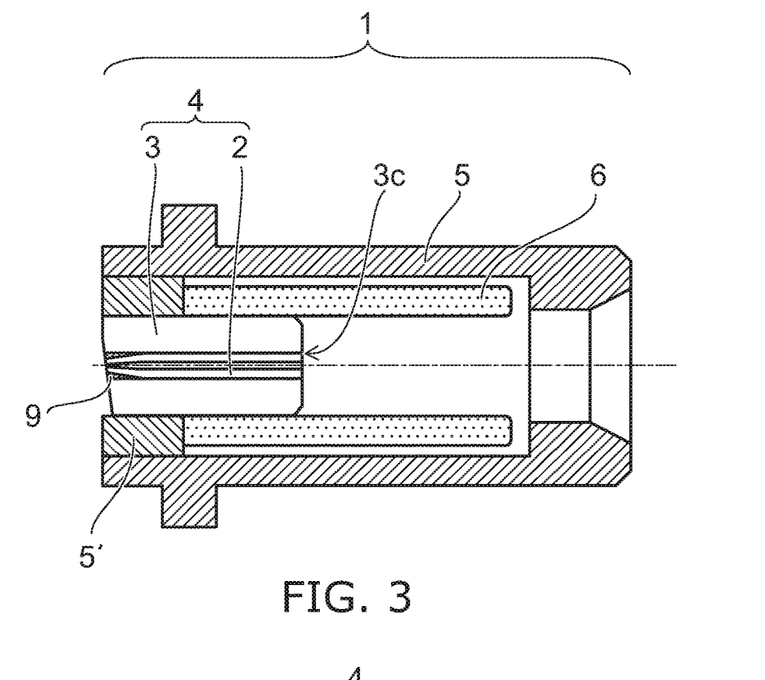
FIG. 3 is a schematic cross-sectional view of an optical receptacle showing a second embodiment of the invention.

FIG. 3 is a schematic cross-sectional view of an optical receptacle showing a second embodiment of the invention.

The members included in the optical receptacle 1 are similar to those of the first embodiment; and the end surface 2a of the optical fiber 2 and a portion of the end surface 3b of the ferrule 3 are polished to be flat surfaces having prescribed angles (e.g., 4 degrees to 10 degrees) from a plane perpendicular to the central axis C1 of the ferrule 3 at the end surface 3a (referring to FIG. 4) on the side opposite to the end surface 3b (referring to FIG. 4) polished into the convex spherical surface of the ferrule 3 including the optical fiber 2 and the through-hole 3c holding the optical fiber 2.

Thereby, similarly to the first embodiment, because the entire portion of the optical fiber 2 where the fiber outer diameter D3 decreases gradually is contained inside the through-hole 3c of the ferrule 3 and the periphery is further covered with the elastic member 9 as the bonding agent, the phenomena of the optical fiber 2 breaking and cracks occurring do not occur easily when polishing the end surface 2a of the optical fiber 2 and actually using as an optical module.

Also, the light that is emitted from the light emitting element connected to the optical receptacle 1, is incident on the optical fiber 2, and is reflected at the end surface 2a of the optical fiber 2 can be prevented from returning to the light emitting element; and the optical element can operate stably.

Figure 4:
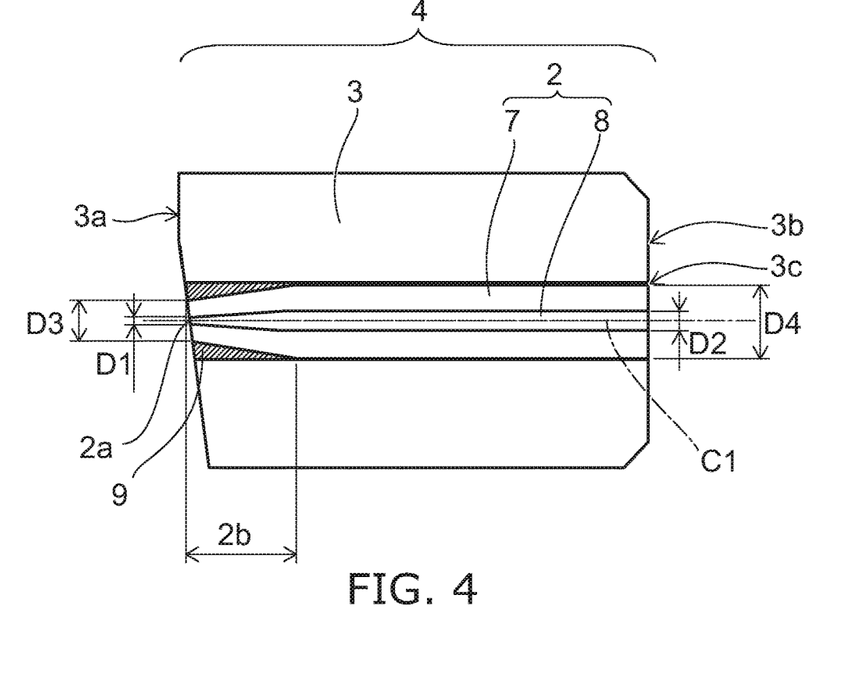
FIG. 4 is an enlarged cross-sectional view of the fiber stub of the second embodiment of the invention.

FIG. 4 is an enlarged cross-sectional view of the fiber stub of the second embodiment of the invention.

Similarly to FIG. 2, the optical fiber 2 is made of the cladding 7 and the core 8 and includes the portion 2b where the optical fiber outer diameter and core diameter decrease gradually toward the tip portion (the end surface 2a) so that the core diameter D1 at the end surface 3a of the fiber stub 4 on the side opposite to the end surface 3b polished into the convex spherical surface is smaller than the core diameter D2 of the end surface 3b polished into the convex spherical surface. That is, the fiber outer diameter D3 at the end surface 3a is smaller than the fiber outer diameter D4 at the end surface 3b.

Normally, to form the surface of the fiber stub 4 having the prescribed angle from a plane perpendicular to the central axis C1 of the ferrule 3, the surface is formed by simultaneously polishing the ferrule 3 and the optical fiber 2 after the optical fiber 2 is inserted into the through-hole 3c of the ferrule 3 and fixed using a bonding agent.

In the first and second embodiments of the invention, the elastic member (the bonding agent) 9 for fixing the optical fiber 2 inside the through-hole 3c of the ferrule 3 exists in a wedge-like configuration at the outer circumference of the portion 2b where the outer diameter of the optical fiber 2 is finer. Therefore, a force of the elastic member 9 acts to press the optical fiber 2 into the through-hole 3c interior of the ferrule 3; and the phenomenon of the end surface 2a of the optical fiber 2 undesirably protruding further than the end surface 3a of the ferrule 3 after the elastic member 9 is cured as the bonding agent does not occur easily.

This phenomenon becomes more pronounced when a high temperature-curing bonding agent is used as the elastic member 9 fixing the optical fiber 2 and the ferrule 3. Normally, because the coefficient of thermal expansion of the bonding agent is larger than that of glass which is the material of the optical fiber 2, if a high temperature-curing bonding agent is used, the force of pressing the optical fiber 2 into the through-hole 3c interior of the ferrule 3 when curing increases further.

Because the end surface 2a of the optical fiber 2 is in the state of being retracted further than the end surface 3a of the ferrule 3, when polishing one end surface of the fiber stub 4 to have a prescribed angle from a plane perpendicular to the central axis C1 of the ferrule 3, the outer circumferential portion of the optical fiber 2 no longer directly contacts the abrasive paper, etc.; and chipping and cracks at the outer circumference of the optical fiber 2 do not occur easily.

Figure 5:
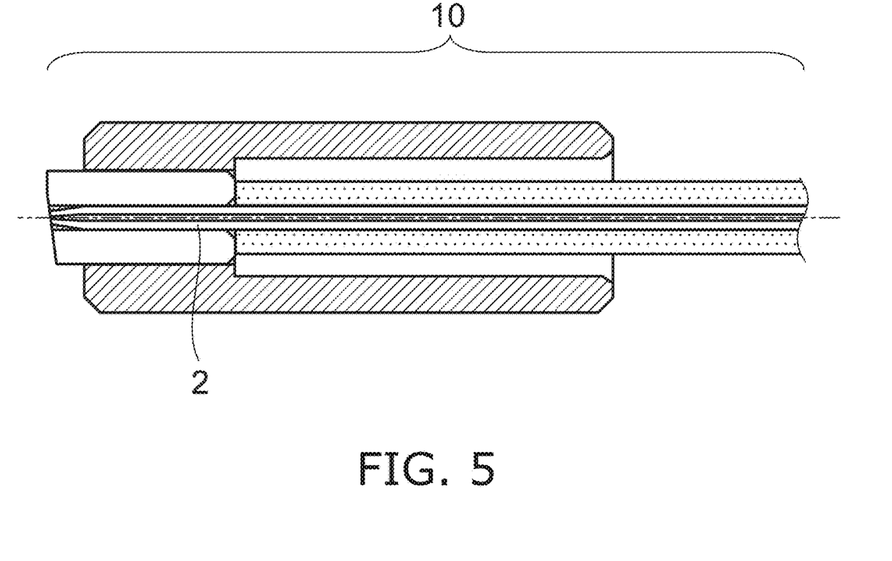
FIG. 5 is a schematic cross-sectional view of an optical pigtail module showing a third embodiment of the invention.

FIG. 5 is a schematic cross-sectional view of an optical pigtail module showing a third embodiment of the invention.

As shown in FIG. 5, the configuration of the invention is applicable to an optical pigtail module 10, etc., as well. Thereby, it is possible to set the total length of the optical pigtail module 10 to be short, maintain the strength of the optical fiber 2, and prevent breaking and cracks.

An investigation relating to the core diameter of the optical fiber implemented by the inventor will now be described with reference to the drawings.

Figure 6A:
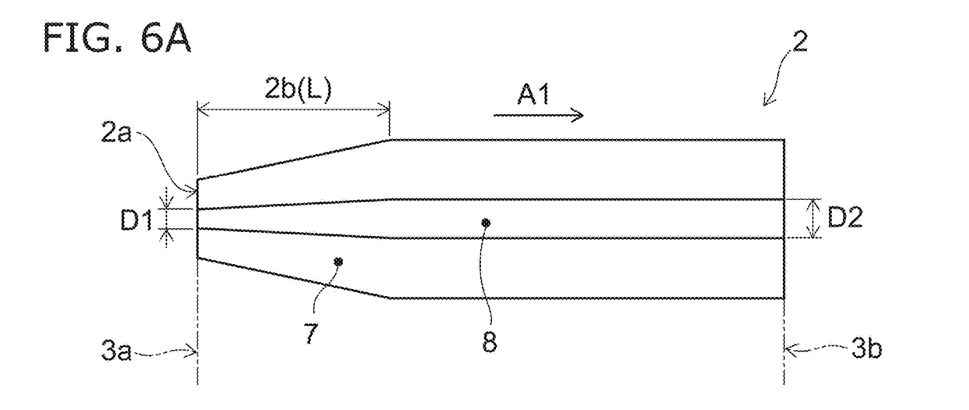
FIG. 6A to FIG. 6C are schematic views showing an example of analysis conditions and analysis results relating to the core diameter.
Figure 6B:
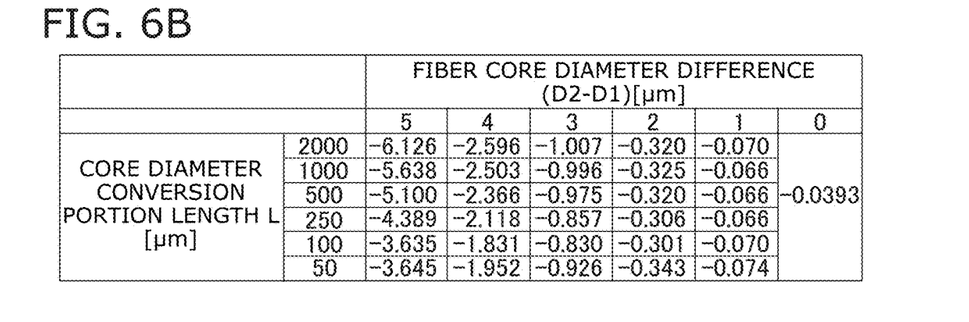
Figure 6C:
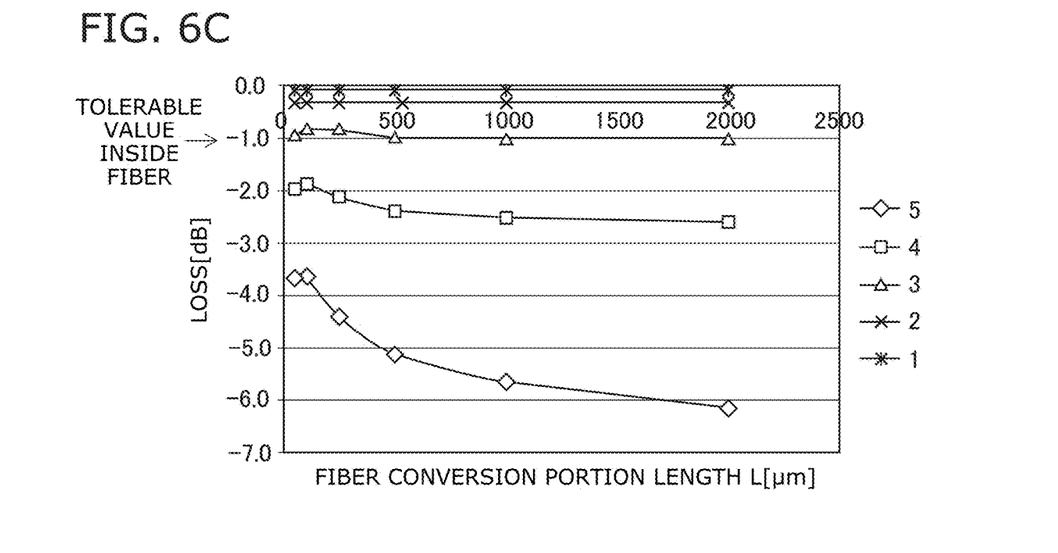

FIG. 6 is a schematic view showing an example of analysis conditions and analysis results relating to the core diameter.

FIG. 6A is a schematic cross-sectional view showing the optical fiber used in the investigation. FIG. 6B is a table showing an example of the results of the investigation. FIG. 6C is a graph showing an example of the results of the investigation.

In the embodiment as described above in reference to FIG. 2 and FIG. 4, the core diameter D1 at the end surface 3a of the fiber stub 4 on the side opposite to the end surface 3b polished into the convex spherical surface is smaller than the core diameter D2 of the end surface 3b polished into the convex spherical surface. In the investigation, the core diameter D2 was set to 8.2 micrometers ($\mu$m). On the other hand, as in the table shown in FIG. 6B, the core diameter D1 at the end surface 3a was changed; and the difference (D2−D1) between the core diameter D2 and the core diameter D1 was set to 1 $\mu$m, 2 $\mu$m, 3 um, 4 $\mu$m, and 5 $\mu$m. Also, as in the table shown in FIG. 6B, a length L of the portion (the core diameter conversion portion) 2b where the outer diameter of the optical fiber 2 decreases gradually was set to 50 $\mu$m, 100 $\mu$m, 250 $\mu$m, 500 $\mu$m, 1000 $\mu$m, and 2000 $\mu$m.

Under such conditions, an example of the results of the loss (decibels: dB) in the case where the light travels in the direction of arrow A1 shown in FIG. 6A is as shown in FIG. 6C. Namely, the loss increases as the difference (D2−D1) between the core diameter D2 and the core diameter D1 increases. Also, in the case where the difference (D2−D1) between the core diameter D2 and the core diameter D1 is 4 $\mu$m and 5 $\mu$m, the loss increases as the length L of the core diameter conversion portion 2b lengthens.

According to knowledge obtained by the inventor, the tolerable value of the loss in the interior of the optical fiber 2 is −1.0 dB. Thereby, it is desirable to set the difference (D2−D1) between the core diameter D2 and the core diameter D1 to be 3 $\mu$m or less and set the length L of the core diameter conversion portion 2b to be 1000 $\mu$m or less. Thereby, the loss in the interior of the optical fiber 2 can be suppressed to be not more than the tolerable value. In the case where the difference (D2−D1) between the core diameter D2 and the core diameter D1 is 2 $\mu$m or less, it is desirable to set the length L of the core diameter conversion portion 2b to be 2000 $\mu$m or less.

Figure 7A:
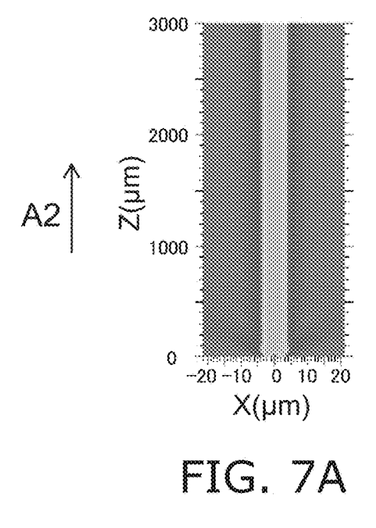
FIG. 7A to FIG. 7C are schematic views showing another example of analysis results relating to the core diameter.
Figure 7B:
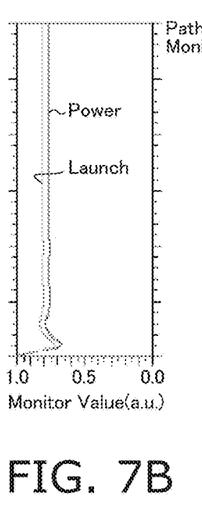
Figure 7C:
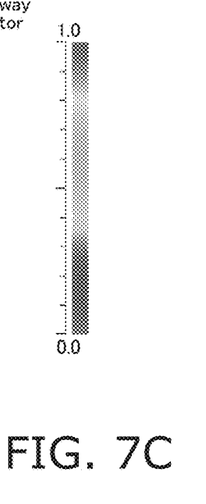

FIG. 7 is a schematic view showing another example of analysis results relating to the core diameter.

FIG. 7A is a schematic view showing an example of the analysis results of the loss in the interior of the optical fiber. FIG. 7B is a schematic view showing an example of the analysis results of the integral (the Launch) of the light energy of the core periphery. In FIG. 7A, the values of the loss in the interior of the optical fiber are illustrated by monotone shading. The legend of the values of the loss is as shown in FIG. 7C.

In the analysis, the difference (D2−D1) between the core diameter D2 and the core diameter D1 was set to 1 $\mu$m; and the length L of the core diameter conversion portion 2b was set to 250 $\mu$m. Also, an analysis was performed for the case where light travels in the direction of arrow A2 shown in FIG. 7A. A vertical axis Z ($\mu$m) of the figure shown in FIG. 7A shows the distance from the end surface 2a of the optical fiber 2. That is, the end surface 2a of the optical fiber 2 is where Z=0 $\mu$m. This is the same for the vertical axis of the figure shown in FIG. 7B as well.

As shown in FIG. 7A, the light is radiated from the core 8 to the cladding 7 at the vicinity of the portion (Z=250 $\mu$m) where the core diameter conversion portion 2b ends and the core 8 changes to become straight. Thereby, it can be seen that loss occurs at the vicinity of the portion (Z=250 $\mu$m) where the core diameter conversion portion 2b ends and the core 8 changes to become straight. From the analysis results, it can be seen that the configuration (the core diameter difference (D2−D1) and the length L) of the core diameter conversion portion 2b have a greater effect on the loss in the interior of the optical fiber 2.

The "Launch" shown in FIG. 7B shows the integral of the light energy of the periphery of the core 8. Because interference of the light occurs directly after the light enters from the end surface 2a of the optical fiber 2, the calculated integral of the light energy greatly attenuates. On the other hand, the integral of the light energy is stable from the vicinity of the portion where the core diameter conversion portion 2b ends. Thereby, actually, it is considered that the attenuation amount of the integral of the light energy occurring from the incident portion (Z=0 µm) to the portion (Z=250 µm) where the core diameter conversion portion 2b ends is the loss due to providing the core diameter conversion portion 2b in the interior of the optical fiber 2.

Figure 8:
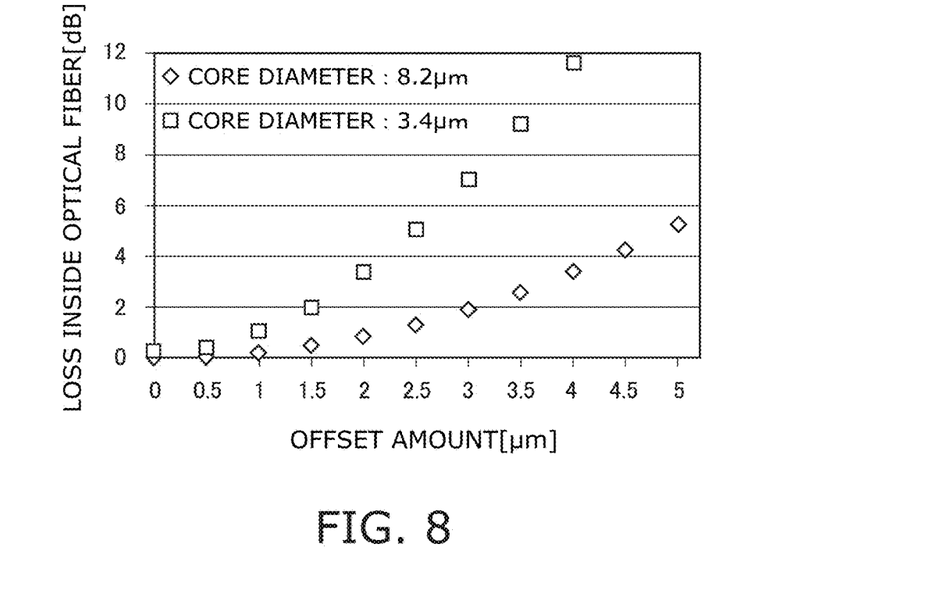
FIG. 8 is a graph showing an example of the analysis results relating to the loss and the offset amount between the light source and the optical fiber center.

FIG. 8 is a graph showing an example of the analysis results relating to the loss and the offset amount between the light source and the optical fiber center.

The horizontal axis of the graph shown in FIG. 8 shows the offset amount (µm) between the light source and the optical fiber center. The vertical axis of the graph shown in FIG. 8 shows the loss (dB) occurring in the interior of the optical fiber 2 between the end surface 2a of the optical fiber 2 and a position that is 3 mm from the end surface 2a of the optical fiber 2 when the light is incident on the end surface 2a of the optical fiber 2 from the light source.

Generally, when assembling the optical receptacle 1 and the light emitting element (not shown), the alignment is performed actively while confirming the coupling power. The assembly between the optical receptacle 1 and the light emitting light source is performed mainly by welding. To economically produce the optical module, it is desirable for the shift of the central axes between the optical receptacle 1 and the light emitting light source to be as small as possible. An example of the analysis results relating to the loss occurring in the interior of the optical fiber 2, the offset amount between the light source and the center of the optical fiber 2 for the optical fiber 2 having a core diameter of 8.2 µm and the optical fiber 2 having a core diameter of 3.4 µm is as shown in FIG. 8. The offset amount between the light source and the center of the optical fiber 2 is equal to the offset amount between the center of the core 8 of the optical fiber 2 and the center of the ferrule 3.

As shown in FIG. 8, when the center of the core 8 of the optical fiber 2 is undesirably separated more than 5 µm from the center of the ferrule 3, the light emitting element and the center of the core 8 can no longer be aligned in the alignment; and the loss in the interior of the optical fiber 2 becomes large. To implement the alignment smoothly, it is desirable for the position adjustment amount of the central axes between the light emitting light source and the optical fiber 2 in the alignment to be 10 µm or less; and it is possible to set the offset amount of the central axes between the light emitting light source and the optical fiber 2 prior to the alignment to be about 5 µm. Therefore, the loss when assembling the optical module can be reduced by controlling the offset amount between the center of the core 8 of the optical fiber 2 and the center of the ferrule 3 to be 5 µm or less. That is, it is desirable for the center of the core 8 of the optical fiber 2 to exist within a range of 5 µm from the center of the ferrule 3.

According to the embodiment as described above, the length of the optical module can be reduced because the core diameter D1 at the end surface 3a of the fiber stub 4 on the side opposite to the end surface 3b polished into the convex spherical surface is smaller than the core diameter D2 of the end surface 3b polished into the convex spherical surface. Also, the discrepancies of breaking and cracks of the optical fiber 2 are suppressed because the entire optical fiber 2 exists inside the through-hole 3c of the ferrule 3.

Because the elastic member 9 exists in a wedge-like configuration at the outer circumference of the portion 2b where the outer diameter of the optical fiber 2 is finer, the protrusion of the optical fiber 2 further outside than the ferrule 3 can be suppressed; and chipping and cracks of the outer circumference of the optical fiber 2 can be suppressed.

Further, because the control of the position of the end surface 2a of the optical fiber 2 is easy, the connection loss when assembling the optical module can be reduced; and the optical module can be assembled economically.

The embodiments of the invention have been described above. However, the invention is not limited to the above description. Those skilled in the art can appropriately modify the above embodiments, and such modifications are also encompassed within the scope of the invention as long as they include the features of the invention. For instance, the shape, dimension, material, arrangement and the like of various components in the fiber stub 4 and the like, and the installation configuration and the like of the ferrule 3 and the optical fiber 2 are not limited to those illustrated, but can be modified appropriately.

Furthermore, various components in the above embodiments can be combined with each other as long as technically feasible. Such combinations are also encompassed within the scope of the invention as long as they include the features of the invention.

INDUSTRIAL APPLICABILITY

According to one embodiment of the invention, an optical receptacle is provided in which, by making the core small at the optical element side end surface of the optical fiber while contributing to shortening the optical module total length, the strength of the deformable portion of the optical fiber can be ensured; the occurrence of breaking and cracks can be prevented; and the decrease of the coupling efficiency can be prevented by suppressing the movement of the optical fiber when using the optical module.

REFERENCE NUMERAL LIST 1 optical receptacle
2 optical fiber
2a end surface
2b core diameter conversion portion (portion)
3 ferrule
3a end surface
3b end surface
3c through-hole
4 fiber stub
5 holder
5' inner holder portion
6 sleeve
7 cladding
8 core
9 elastic member
10 optical pigtail module

The invention claimed is:

1. An optical receptacle, comprising:
a fiber stub including an optical fiber, a ferrule, and a bonding elastic member, the optical fiber including cladding and a core conducting light, the optical fiber having a first portion and a second portion, a core diameter and a fiber outer diameter in the first portion decreasing gradually toward an end surface of the ferrule on a side opposite to a side to be optically connected to a plug ferrule, the core diameter and the fiber outer diameter in the second portion being constant, the ferrule having a through-hole fixing the optical fiber, the bonding elastic member fixing the optical fiber in the ferrule;
a holder and an inner holder portion holding the fiber stub, and a sleeve disposed within the holder, one end of the sleeve being connected to a tip of the fiber stub within the holder, and one other end of the sleeve being configured to be connected to an end of a plug ferrule to be inserted into the optical receptacle so that portions of end surfaces of the plug ferrule and the fiber stub will be held in contact with each other by the sleeve, wherein:

the inner holder portion holds an outside face of the ferrule including a portion of the outside face of the ferrule surrounding the entire first portion of the optical fiber and another portion of the outside face of the ferrule surrounding at least part of the second portion of the optical fiber;

the holder covers an outside face of the inner holder portion and an outside face of the sleeve; and an outside face of the inner holder portion contacts an inside face of the holder.

2. The optical receptacle according to claim 1, wherein an end surface of the optical fiber and the end surface of the ferrule exist in substantially the same plane at the end surface of the fiber stub on the side opposite to the side to be optically connected to the plug ferrule.

3. The optical receptacle according to claim 1, wherein a refractive index of the core at the first portion of the optical fiber is substantially the same as the refractive index of the core at the second portion of the optical fiber, and a refractive index of the cladding at the first portion of the optical fiber is substantially the same as the refractive index of the cladding other than at the second portion of the optical fiber.

4. The optical receptacle according to claim 1, wherein a center of the core exists within a range of 0.005 millimeters from a center of the ferrule at the end surface of the fiber stub on the side opposite to the side to be optically connected to the plug ferrule.

5. The optical receptacle according to claim 1, wherein the end surface of the ferrule and an end surface of the optical fiber are polished to be substantially perpendicular to a central axis of the fiber stub at the end surface of the fiber stub on the side opposite to the side to be optically connected to the plug ferrule.

6. The optical receptacle according to claim 1, wherein an end surface of the optical fiber and a portion of the end surface of the ferrule have a prescribed angle from a plane perpendicular to a central axis of the fiber stub at the end surface of the fiber stub on the side opposite to the side to be optically connected to the plug ferrule.

7. The optical receptacle according to claim 1, wherein the bonding elastic member is an epoxy.

8. The optical receptacle according to claim 1, wherein the bonding elastic member is silicone.

\* \* \* \* \*